United States Patent [19]

Lotter et al.

[11] 3,894,215

[45] July 8, 1975

[54] TIME CLOCK SYSTEM

[75] Inventors: Richard Lotter, Ridgewood; Bernard Roger Fernau, Malverne, both of N.Y.

[73] Assignee: Decicom Systems, Inc., Brooklyn, N.Y.

[22] Filed: Oct. 17, 1973

[21] Appl. No.: 407,334

[52] U.S. Cl. ..................235/61.6 R; 235/61.11 E; 235/61.12 R; 346/82

[51] Int. Cl. .......................................... G06k 7/10

[58] Field of Search ... 235/61.12 R, 61.7 R, 61.8 R, 235/61.11 E, 61.6 R; 340/174, 172.5; 346/82

[56] References Cited

UNITED STATES PATENTS

| | | | |
|---|---|---|---|
| 3,671,717 | 6/1972 | Bieser | 235/61.11 E |
| 3,740,727 | 6/1973 | Griffin | 340/173 R |
| 3,751,639 | 8/1973 | Searle et al. | 235/61.11 E |
| 3,751,640 | 8/1973 | Daigle et al. | 235/61.11 E |
| 3,754,120 | 8/1973 | Fitzgerald | 235/61.8 R |

*Primary Examiner*—Stanley M. Urynowicz, Jr.
*Attorney, Agent, or Firm*—Blum, Moscovitz, Friedman & Kaplan

[57] ABSTRACT

A time clock system for use with a time card bearing a predetermined number of digits of identifying data wherein said card is manually displaced past a sensor for reading said data, the output of the sensor being temporarily stored in a memory. Upon detection of the proper passage of the card past the sensor, the stored contents of the memory is applied to a computer or data storage device. The system may include a printer for marking the time on the time card.

13 Claims, 4 Drawing Figures

PATENTED JUL 8 1975 3,894,215

SHEET 2

TIME CLOCK SYSTEM

BACKGROUND OF THE INVENTION

This invention relates to time clocks for registering times on record cards, hereinafter referred to as "time cards" to indicate the commencing and finishing times of individual jobs or periods of employment and the like. In known devices, a time card is inserted into the device and the time of insertion, sometimes combined with the relevant date, is imprinted on the card in fields provided thereon, time being usually indicated in hours and minutes, or in hours and decimal fractions of hours. Such mechanical imprints must be evaluated by a clerk and experience has shown the manual examination of imprinted cards is tedious and that mistakes are likely to occur. In order to overcome this difficulty, it has been proposed to record the data in machine-readable form on the time card by an appropriate marking means in the time clock. Still another approach is to provide an identification card for each worker which is inserted in the time clock and read by the time clerk, the time clock then preparing a machine-readable card bearing information identifying the job or individual associated with the identification card and the time of the transaction. The disadvantage of this system is that the worker does not have the benefit of a normal time card, and therefore lacks confidence in the system. Further, the worker must maintain a separate ID card, which can be lost. In general, the systems incorporating these approaches have proved cumbersome and impractical.

By providing a time clock system which permits both conventional imprinting and reading of identification data on the time card while providing a time clock system which, to the user, appears to be operating in the same way as a conventional time clock, the foregoing deficiencies in the prior art arrangements have been overcome.

SUMMARY OF THE INVENTION

Generally speaking, in accordance with the invention, a time clock system is provided for use with a time card having identifying indicia on a portion thereof including sensing means for reading said identifying indicia when the inidica-bearing portion of one of said time cards is passed thereby, memory means coupled to said sensing means for temporarily storing data representative of the read indicia; and means for detecting the passage of said card along a predetermined path past said sensor means, the transmission of the contents of said memory means being responsive to the output of said detecting means.

The inidica may consist of a predetermined number of digits positioned to be sequentially carried past the sensor means, said detecting means counting the number of digits read by said sensor means. Said detecting means may also include means for detecting the alignment of the time card to insure registration of said indicia with said sensing means and means for detecting the positioning of said card at a point along said path at which the indicia-bearing portion of said card is past said sensor means.

The time clock may include conventional print means actuated by said detector means for imprinting on the time card the time, as well as alarm means actuated by said detector means to provide an indication of the failure of the user to pass the time card along the predetermined path. The indicia may be in the form of coded apertures in the time card while the sensor means may include photo-sensitive means.

Still other objects and advantages of the invention will in part be obvious and will in part be apparent from the specification and drawings.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
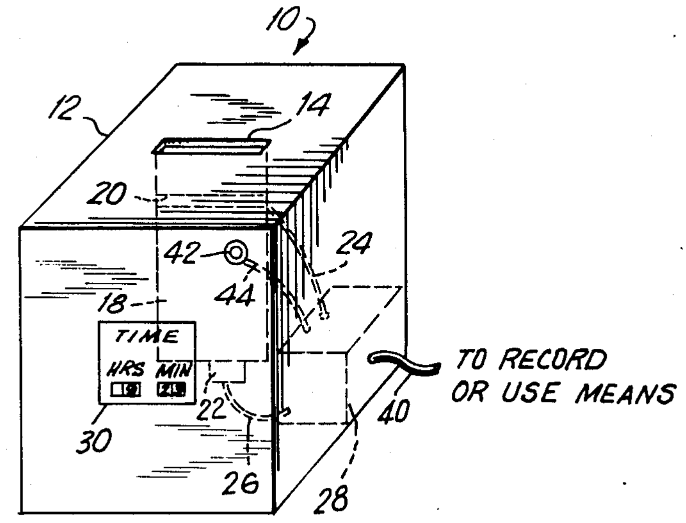
FIG. 1 is a perspective view of a time clock system in accordance with the invention.

Referring now to FIG. 1, the time clock system 10 depicted includes a housing 12 containing a narrow slot opening 14 in the upper surface thereof. The slot opening is dimensioned to receive a time card such as time card 16 depicted in FIG. 2. Within housing 12 and extending from slot 14 is a guide 18 dimensioned to define a path along which time card 16 may follow after passing through slot opening 14. Guide 18 supports a sensor block 20 which extends laterally across the path followed by an inserted time card and consists of a linear array of sensing devices as will be more particularly described below. At the end of the path defined by guide 18 is a microswitch positioned for actuation by a card reaching that point along said path. Sensor block 20 and microswitch 22 are resepectively connected by cables 24 and 26 to an electronic package 28, which receives the sensed data from sensor block 20 and is in part controlled by the operation of microswitch 22. Mounted on an external surface of cabinet 12 is a conventional digital clock display 30. The display would be coupled to a printing device (not shown in FIG. 1) within cabinet 12 which imprints the time, and if desired, the date in the appropriate field on time card 16 in a conventional manner. Said printer may be actuated by a separate sensing device (not shown) or may be actuated by the electronics package as described below.

Time card 16 is a conventional IBM punch card of essentially rectangular shape having corner 30 thereof cut at an angle. The card would be imprinted in region 32 or other regions with information identifying the individual or job associated with the card. In the example depicted in FIG. 2, the name and social security number of the employee is imprinted in a conventional manner. Region 34 of the card contains a number of digits, in this case ten, of an identification code. The identification code is marked on the card by punching holes therein in a conventional hollerith code, although embossments, magnetic marks or other means of applying the identification code to the time card could be used. The identification code identifies either the job or the individual identified with the card in a machine readable form. In addition, fields 36 are identified on the face of the card within which the printer incorporated in the housing 12 may print time in, time out and the day in a conventional manner. The latter portion of time card 16 functions in a conventional manner in cooperation with the printer of time clock system 10 to provide the worker with an immediate visual indication of the time recorded by the system and a permanent record of that time for his use.

The time clock system 10 in accordance with the invention is operated by inserting card 16 in slot opening 14, leading with edge 38 of said card, the card being aligned so that cut edge 30 thereof is on a predetermined side, for example, the left as viewed in FIG. 1, when the card is inserted. The user manually pushes the card along guide 18, thereby sequentially passing each of the digits of the identification code in region 34 of the card past sensor block 20 until microswitch 22 is closed. Electronics package 28 is adapted to temporarily store the data representative of the identification code read by sensor block 20, and to apply said temporarily stored data along line 40 to a recording or using device (not shown) such as a computer, a magnetic tape recording device, a telephone line for transmission, or the like. The electronic package is adapted to count the number of digits read by sensor head 20, and to transmit the stored data only in response to a proper count and the actuation of microswitch 22. In this way, false data caused by the jiggling of the card in guide 18 or by incomplete insertion of the card is avoided.

Where the card has been improperly inserted, the user is given a visual indication by means of alarm light 42 mounted on housing 12 and coupled to electronic package 28 by cable 44. The user would know to reinsert the card if alarm light 42 is actuated.

Figure 3:
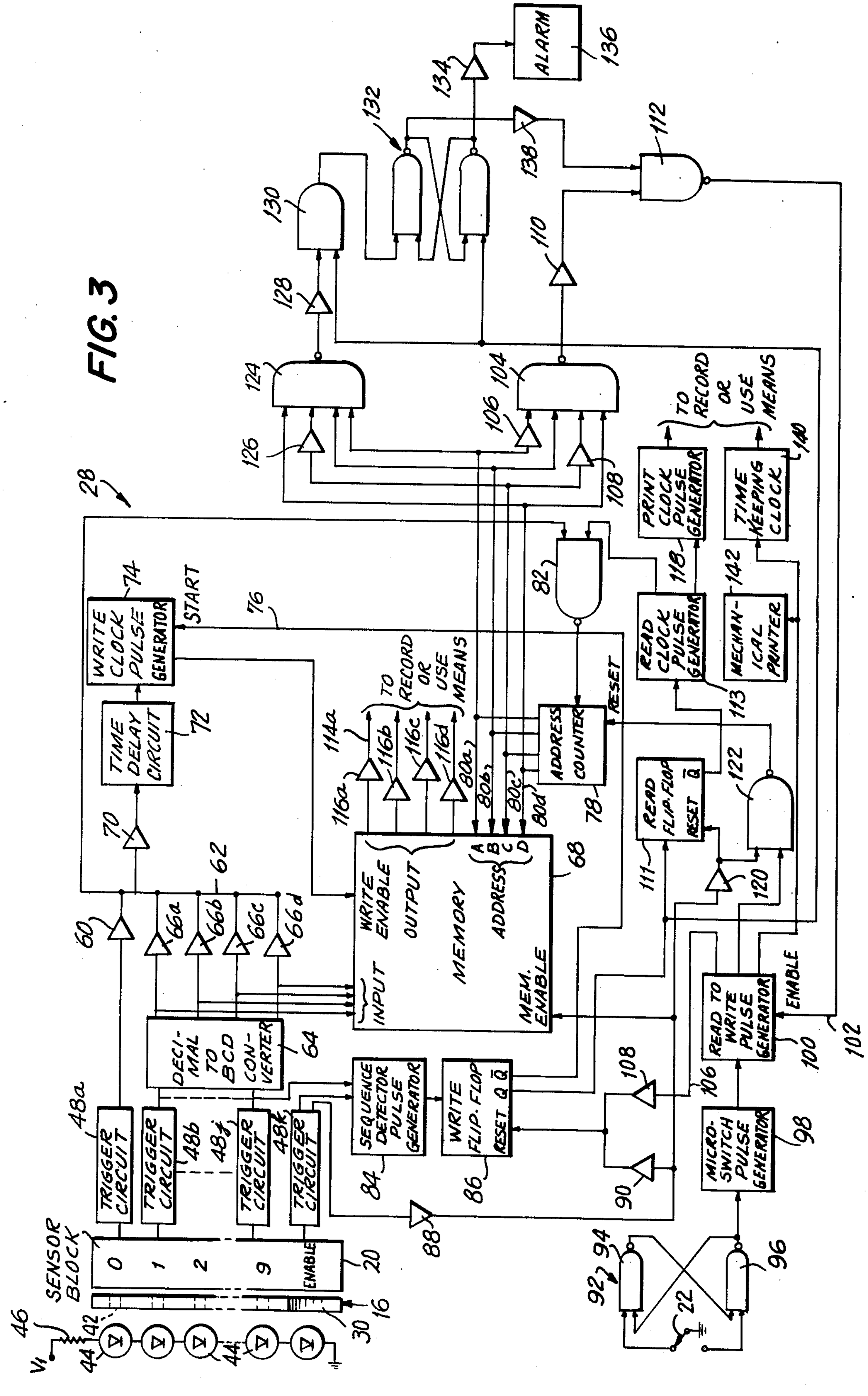
FIG. 3 is a block circuit diagram of the time card system in accordance with the invention.

Referring now to FIG. 3, a block circuit diagram of the time clock system in accordance with the invention is depicted. As shown therein, the sensor block consists of an array of eleven sensors aligned side-by-side to scan eleven positions on card 10. Ten of said positions, identified as positions 0 through 9 are aligned with postions in which holes 42 of the hollerith code can be punched. The eleventh position, labeled "enable" is aligned with cut edge 30 of the card to detect said position as more particularly described below. Facing sensor block 12 is a corresponding array of 11 series-connected light emitting diodes 44 which serve as a light source for the sensors of sensor block 20. Said light emitting diodes are connected in series between ground and a power voltage $V_1$ through resistor 46. The output of each of the sensors of sensor block 20 are respectively applied to a trigger circuit 48*a*, *b*, ..., *j*, *k*, with trigger circuit 48*a* connected to the zero sensor and trigger circuit 48*k* connected to the enable sensor.

Figure 4:
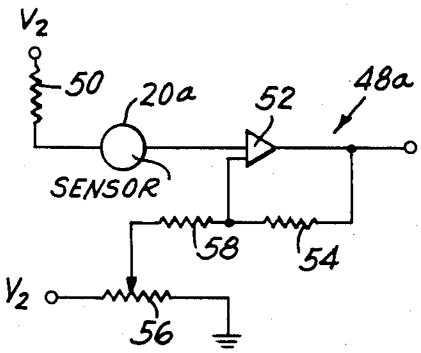
FIG. 4 is a circuit diagram of the sensor-trigger circuit portion of the time card system of FIG. 3.

One embodiment of a sensor-trigger circuit combination is depicted in FIG. 4, wherein the sensor 20*a* is a phototransistor connected between resistor 50 and inverter 52. A power source $V_2$ is applied to the phototransistor through resistor 50, while inverter 52 forms a part of trigger circuit 48*a*, said trigger circuit being a Schmitt trigger having a feedback loop defined by resistor 54 and a sensitivity adjustment established by potentiometer 56 connected through resistor 58 to the feedback input to inverter 52. The circuit of FIG. 4 produces a level change at the output when the state of the phototransistor changes, as when light is first detected, or when the light is withdrawn. The arrangement is characterized by a hysteresis effect in that the threshold of response of the trigger circuit is different when going between levels, so that the rate of speed of card insertion does not affect the accurate sensing, nor does slight jiggling of the card during insertion. Small backward motions of the card will be overlooked in detecting the edge of a hole, but a large backward excursion would be detected as described below.

The output of trigger circuit 48*a* is applied through inverter 60 to a clock line 62. The output of trigger circuits 48*b*, 48*c*, ... 48*j* corresponding to the 1 throught 9 positions are applied to decimal to BCD converter 64 which converts the hollerith code to a BCD code output on four lines. Said BCD output is applied through corresponding inverters 66*a*, 66*b*, 66*c* and 66*d* to clock line 62, and directly applied as an input to memory 68. A signal representative of the detection of each digit position on region 34 of card 16 thus appears on clock line 62 to serve as an internal clock. This clock signal is applied through inverter 70 and time delay circuit 72 as the input to a write clock pulse generator 74. Said write clock pulse generator, when enabled by a signal applied thereto along line 76, applies a delayed clock pulse to memory 68 to enable the temporary storing therein of the BCD data representative of the identification code read by sensor block 20. The time delay is to insure that erroneous data caused by noise is not stored. Memory 68 is controlled by an address counter 78 having a BCD output of four lines 80*a*, *b*, *c*, *d* providing 16 data storage addresses within the memory. The address counter is indexed through NAND gate 82 by thd clock signal from clock line 62 during the writing of the sensed data into the memory so that each bit of sensed data is disposed in a selected address location.

The output of trigger circuit 48*j* associated with the numeral 9 position of sensor block 20 and trigger circuit 48*k* associated with the enable position of said sensor block are applied to sequence detector pulse generator 84. The latter device is adapted to produce an output when the inputs thereto are received in a prescribed order. In other words, if a level change occurs first in the output of trigger circuit 48*j* and then, at a later time, in the output of trigger circuit 48*k*, sequence detector pulse generator 84 willl produce an output applied to write flip-flop 86. The foregoing condition is representative of the case where cut edge 30 of card 16 is in the proper orientation so that the card first blocks the sensor at the 9 position and at a later time blocks the sensor at the enable position. The output of sequence detector pulse generator 84 sets write flip-flop 86 in a state such that the output $\overline{Q}$ is applied along line 76 to start clock pulse generator 74, which in turn enables memory 68 to store the data. In other words, data storage does not occur unless the card is in the proper alignment when inserted. Write flip-flop 86 is reset under two separate conditions. When the card is removed, the change in state of the output of trigger circuit 48*k* is applied through inverters 88 and 90 to the reset input of right flip-flop 86. The second reset case is when the card engages microswitch 22. Said switch is connected to a flip-flop 92 defined by NAND gate 94 and 96. When microswitch 22 is engaged by the leading edge 38 of the card, a signal is applied to microswitch pulse generator 98, which in turn applies an actuation signal to read to write pulse generator 100. Read to write pulse generator 100 produces an output signal only when it ia enabled by a signal along line 102. Said signal is derived by NAND gate 104. The input to NAND gate 104 is from the output of address counter 78 along lines 80*a*, *b*, *c*, *d*. The signal from lines 80 *a* and 80*c* is applied through inverters 106 and 108 respectively so that NAND gate 104 detects a count of 10. At the count of 10 on the address counter, representative of the counting of the 10 digits of data on card 16, on output signal is applied through inverter 110 to one input of NAND gate 112, the output of which is applied through line 102 to read to write pulse generator 100. In other words, an output is produced by read to write pulse generator 100 if the count of address counter 78 is at ten when microswitch 22 is engaged. A first output of read to write pulse generator 100 is applied along line 106 through inverter 108 to reset right flip-flop 86. When so reset, an output Q of said flip-flop is applied to set read flip-flop 111, the output of which, at terminal $\overline{Q}$ is applied to start read clock pulse generator 113. The output of read clock pulse generator 113 is applied as one of the inputs to NAND gate 82, the output of which is applied to address counter 78, to cause the address counter to sequence through the addresses in memory 68 in which data is stored, and to apply the stored data to output lines 114*a*, *b*, *c*, *d* through inverters 116*a*, *b*, *c*, *d*. These outputs are applied to a record or use means such as a computer, magnetic tape or the like. Read clock pulse generator 113 also actuates print clock pulse generator 118 which generates a clock pulse for transmission to said record or use means. Read flip-flop 110 is reset by a signal from trigger circuit 48*k* applied through inverters 88 and 120, which signal is representative of the withdrawal of the card from the device, by which time the read cycle should have been completed and the circuit disposed for a new right cycle (by the application of a like signal through inverters 88 and 90 to the reset terminal of write flip-flop). Said signal also constitutes one of the inputs to NAND gate 122, the other input to said NAND gate being the output of read to write pulse generator 100. Said NAND gate applies an output to reset address counter 78, either at the end of the write cycle (in response to read to write pulse generator 100) or at the end of the read cycle (in response to the signal from trigger circuit 48*k*).

As a further check on the operation of the system, a second NAND gate 124 is connected to detect the output of address counter 78 through lines 80*a*, *b*, *c*, *d*. The input from said lines is direct, except in the case of line 80*c* which is applied to gate 124 through an inverter 126. Thus, NAND gate 124 detects a count of eleven, indicative of the insertion, partial withdrawal and reinsertion of the card. The output of NAND gate 124 is applied through inverter 128 to AND gate 130, the other input to said AND gate being derived from the Q output of right flip-flop 86. The signal from Q output and the output of AND gate 130 are applied to respective inputs of a latching alarm flip-flop 132. The alarm output of said latching alarm flip-flop, caused by the detection of a count of eleven at NAND gate 124 is applied through inverter 134 to alarm 136 which may include alarm light 42 (FIG. 1). The alarm stays lit until write flip-flop 86 is actuated to indicate the start of a new cycle. The alternate output of latching flip-flop 132 is applied through inverter 138 to define the other input to NAND gate 112.

In addition to the identification data stored in memory 68, it is also necessary to apply to the record or use means a time indication. This result is achieved by applying an output of read to write pulse generator 106 to time keeping clock 140, the output of which is applied to the record or use means at an appropriate time during the read cycle.

As described above, if desired, the mechanical printer 142 of the device may be likewise driven by the output of read to write pulse generator 100, which output is only produced if the card is properly inserted and the microswitch 22 is actuated.

Figure 2:
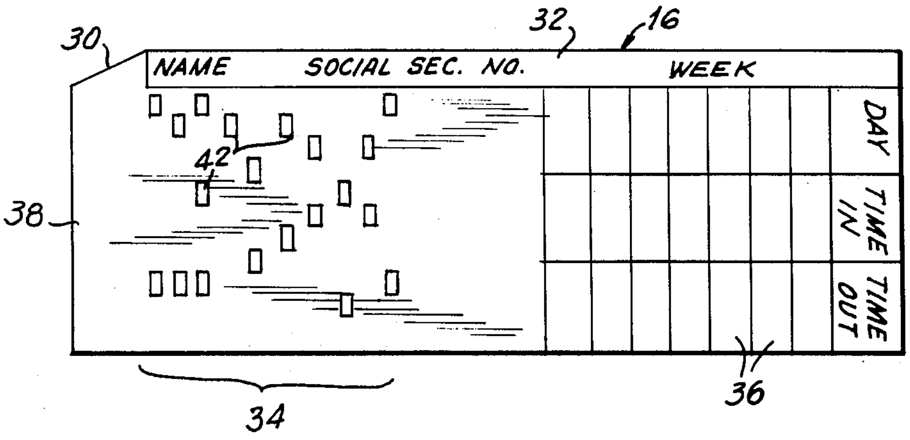
FIG. 2 is a top plan view of a time card for use with the system of FIG. 1.

The card reading circuitry of FIGS. 2 and 4 can be applied to systems other than time clock systems, including any system requiring the reading of punched or otherwise coded cards such as identification cards, credit cards, inventory cards and the like. In such applications, switch 22 can be replaced by a photocell detector or the like and means can be provided for selectively adjusting the count of digits to which NAND gates 124 and 104 respond. In other words, the circuit can be disposed so that the user can adjust the number of digits to be read before the write operation is performed.

It will thus be seen that the objects set forth above, and those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

What is claimed is:

1. A time clock system for use with a time card having identifying indicia on a portion thereof arranged in a plurality of digits spaced in one direction along said card, comprising time card guide means defining a path for the displacement of said time card in a direction substantially parallel to said one direction along said card; sensing means in the path of displacement of sid time card for reading of identifying indicia when the indicia-bearing portion of one of said time cards is passed thereby; memory means coupled to said sensing means for temporarily storing data representative of the read indicia; means for detecting the passage of said card along a prescribed path in said guide means past said sensor means, said detecting means including means for counting the number of digits read by said counting means, and card position sensing means for detecting the passage of the card past the sensor means to the end of said prescribed path; and means for enabling the transmitting from said memory means of the temporarily stored data representative of the read indicia in response to an output of said detector means representative of the combined occurrence of the counting of a predetermined number of digits and the actuation of said card position sensing means at the end of said prescribed path, and therefor the passage of said card along said prescribed path.

2. A time clock system as recited in claim 1, wherein said guide means permits normal displacement of said card; and including means for generating a clock signal from the output of said sensing means for controlling the writing of data into said memory means.

3. A time clock system as recited in claim 1, wherein said indicia are in the form of coded apertures, said sensing means including photo-sensitive means.

4. A time clock system as recited in claim 3, wherein said sensing means includes trigger circuit means responsive to said photo-sensitive means for producing a signal representative of a sensed aperture; said trigger circuit means being adapted to have a hysteresis response characteristic, whereby minor jiggling of the time card in said guide means does not affect the operation of said system.

5. A time clock system as recited in claim 1, including alarm means providing the user or said system with an indication that a number of digits other than the predetermined number of digits were counted.

6. A time clock system for use with a time card having a cut-off region in the leading edge thereof as recited in claim 1, said sensing means including at least two sensor devices positioned in side-by-side relation in the path of said card, one of said sensor devices being in registration with an uncut portion of said leading edge of said card, the other of said sensor devices being in registration with the cutaway portion of said leading edge of said card when said card is properly aligned, said detecting means including means responsive to the order of actuation of said sensor devices for at least in part controlling the actuation of said transmitting means whereby the transmitting means is actuated only if said time card is properly aligned in said guide means.

7. A time clock system as recited in claim 1, including print means coupled to said detector means for actuation thereby for imprinting on said time card the time period.

8. A card reading system for use with a card having identifying indicia on a portion thereof arranged in a plurality of digits spaced in one direction along said card and adapted for displacement along a prescribed path in a direction substantially parallel to said one direction along said path, comprising sensing means in the path of displacement of said card for reading of identifying indicia when the indicia-bearing portion of said card is passed thereby; memory means coupled to said sensing means for temporarily storing data representative of the read indicia; means for detecting the passage of said card along said prescribed path past said sensor means, said detecting means including means for counting the number of digits read by said counting means, and card position sensing means for detecting the passage of the card past the sensor means to the end of said prescribed path; and means for enabling the transmitting from said memory means of the temporarily stored data representative of the read indicia in response to an output of said detector means representative of the combined occurrence of the counting of a predetermined number of digits and the actuation of said card position sensing means at the end of said prescribed path, and therefor the passage of said card along said prescribed path.

9. A card reading system as recited in claim 8, wherein said guide means permits manual displacement of said card and including means for generating a clock signal from the output of said sensing means for controlling the writing of data into said memory means.

10. A card reading system as recited in claim 8, including alarm means providing the user of said system with an indication that a number of digits other than the predetermined number of digits were counted.

11. A card reading system for use with a card having a cut-off region in the leading edge thereof as recited in claim 8, said sensing means including at least two sensor devices positioned in side-by-side relation in the path of said card, one of said sensor devices being in registration with an uncut portion of said leading edge of said card, the other of said sensor devices being in registration with the cutaway portion of said leading edge of said card when said card is properly aligned, said detecting means including means responsive to the order of actuation of said sensor devices for at least in part controlling the actuation of said transmitting means whereby the transmitting means is actuated only if said time card is properly aligned in said guide means.

12. A card reading system as recited in claim 8, wherein said indicia are in the form of coded apertures, said sensing means including photo-sensitive means.

13. A card reading system as recited in claim 12, wherein said sensing means includes trigger circuit means responsive to said photo-sensitive means for producing a signal representative of a sensed aperture; said trigger circuit means being adapted to have a hysteresis response characteristic, whereby minor jiggling of the card in said guide means does not affect the operation of said system.

* * * * *